(No Model.)
C. H. DENISON.
NUT LOCK.
No. 252,868. Patented Jan. 31, 1882.
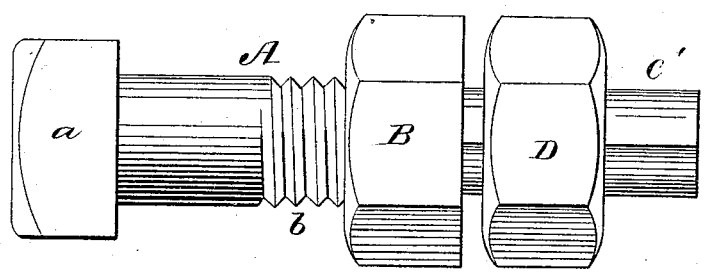
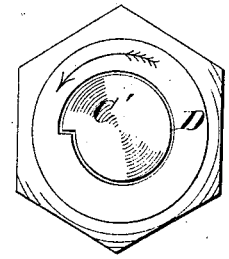
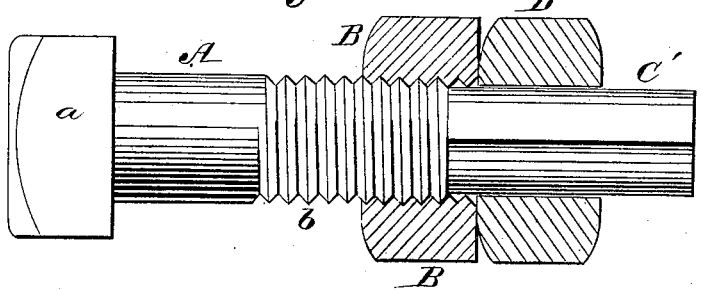
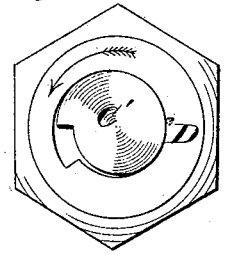
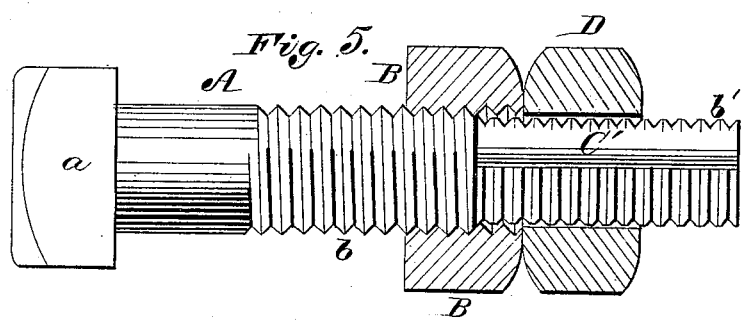
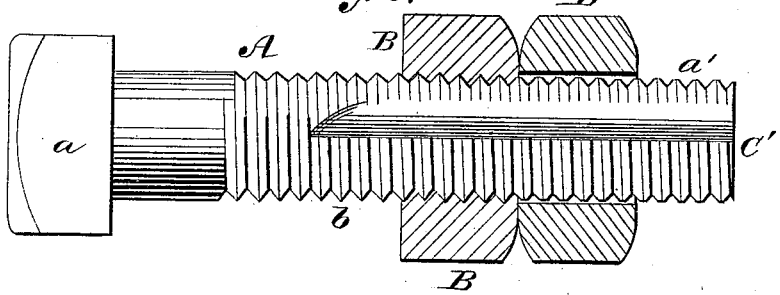
Witnesses:
Henry R. Parker
Robt W. Matthews
Inventor:
Charles H. Denison
per James A. Whitney
Atty.

UNITED STATES PATENT OFFICE.

CHARLES H. DENISON, OF NEW YORK, N. Y.

NUT-LOCK.

SPECIFICATION forming part of Letters Patent No. 252,868, dated January 31, 1882.

Application filed June 18, 1881. (No model.)

*To all whom it may concern:*

Be it known that I, CHARLES H. DENISON, of the city, county, and State of New York, have invented an Improvement in Lock Nuts and Bolts, of which the following is a specification.

This invention relates to that class of screw-bolts in which a jam-nut is used to prevent the displacement of the ordinary nut from jarring or other causes, the object of such devices being that when the last-named nut is brought home to its place it may be there retained against all the ordinary vicissitudes of use—as, for example, when applied to the joints of railway-tracks, &c.

My invention comprises a novel combination of parts, whereby any tendency to a reverse movement on the part of the ordinary nut tends only to hold the jam-nut more firmly in its place, and thereby prevent the nut itself from turning or moving from its proper position.

Figure 1 is a side view, and Fig. 2 a central longitudinal view, of a nut-lock and bolt constructed according to my said invention. Fig. 3 is an end view of the same, showing the manner in which the jam-nut is placed upon the bolt, and Fig. 4 is an end view of the same, showing the manner in which the jam-nut is tightened upon the bolt. Figs. 5 and 6 are longitudinal sectional views, illustrating certain modifications of my said invention.

A is the bolt, provided at one end with the usual head, $a$, and with the usual screw or threaded portions, $b$, upon which is placed the usual nut, B. Upon that end of the bolt opposite that at which is placed the head $a$ is provided a shank, C', which in its cross-section is cam-shaped or eccentric in form, as represented in the end views, Figs. 3 and 4.

D is the jam-nut, having the external configuration of the ordinary nut, in order that it may be conveniently turned with a wrench, and having its bore or interior of a cam or eccentric shape corresponding to the cross section of the shank C' of the bolt A, so that it may be slipped upon the said shank C', as illustrated in Figs. 1 and 3. The nut B being brought to the requisite position upon the threaded portions $b$ of the bolt A, the jam-nut is slipped inward upon the shank C' until its inner face is brought snugly against the adjacent face or outer end of the nut B. This done, the jam-nut D is turned axially, as indicated in Figs. 3 and 4. The cam-like or eccentric shape of the shank C', acting in conjunction with the corresponding internal contour of the jam-nut D, binds the jam-nut upon the shank C' with a frictional hold of very great tenacity, so that the longitudinal movement of the jam-nut D upon the shank C' is practically impossible, and the twist or direction of the screw-thread $b$ being such that the nut B, in turning off from the screw-thread $b$, will move in the same direction as the jam-nut D moves in being brought to bite or hold upon the shank C', as just explained, it follows that the said nut B, in any tendency to turning off from the screw-thread $b$, only binds the closer upon the jam-nut D, and its only action upon the said jam-nut D is to hold or bind the same tighter upon the shank C', so that, the longitudinal movement of the said jam-nut D being prevented, the turning or outward movement of the nut B is in like manner rendered impossible.

It is preferred that the cam-shaped or eccentric bore or interior of the jam-nut B be smooth, inasmuch as this permits its adjustment longitudinally upon the shank C' with extreme accuracy and to an infinitesimal fraction of space. In some cases, however, it may be desirable that the shank C' should, so to speak, indent itself in the internal surface of the jam-nut D, in order that the said jam-nut may have a sharper bite or hold upon the said shank. To this end, therefore, the shank itself may be formed with circumferential teeth $a'$, which may be either simply a continuation, somewhat flattened, of the thread $b$, as represented in Fig. 6, or it may consist of circumferential parallel ridges or teeth $b'$, formed upon the shank C', irrespective of the pitch of the adjoining screw-threads $b$, as represented in Fig. 5.

What I claim as my invention is—

The bolt A, having the screw-threads $b$ and cam-shaped or eccentric shank C', in combination with the nut B and the jam-nut D, having the cam-like or eccentric bore or interior corresponding in shape to the cross-section of the shank C' of the bolt, the said parts being combined and arranged for joint use and operation substantially as and for the purpose herein set forth.

CHARLES H. DENISON.

Witnesses:
 THOMAS E. CROSSMAN,
 ROBT. W. MATTHEWS.